(12) United States Patent
Luo

(10) Patent No.: US 9,944,264 B2
(45) Date of Patent: Apr. 17, 2018

(54) BALANCE VALVE AND VACUUM BOOSTER

(71) Applicant: BWI (Shanghai) Co., Ltd., Shanghai (CN)

(72) Inventor: Dongqiang Luo, Shanghai (CN)

(73) Assignee: BWI (SHANGHAI) CO., LTD., Shanghai (CN)

( * ) Notice: Subject to any disclaimer, the term of this patent is extended or adjusted under 35 U.S.C. 154(b) by 26 days.

(21) Appl. No.: 14/640,369

(22) Filed: Mar. 6, 2015

(65) Prior Publication Data
US 2016/0068145 A1    Mar. 10, 2016

(30) Foreign Application Priority Data

Sep. 10, 2014    (CN) .................... 2014 2 0518578 U

(51) Int. Cl.
   *B60T 13/57*    (2006.01)
   *F16K 1/36*    (2006.01)
   *F16K 1/42*    (2006.01)
   *F16K 39/02*    (2006.01)

(52) U.S. Cl.
   CPC ................ *B60T 13/57* (2013.01); *F16K 1/36* (2013.01); *F16K 1/42* (2013.01); *F16K 39/02* (2013.01)

(58) Field of Classification Search
CPC ... B60T 13/57; F16K 1/36; F16K 1/42; F16K 39/02; F16J 15/3204
USPC ................... 251/282, 333; 91/376 R
See application file for complete search history.

(56) References Cited

U.S. PATENT DOCUMENTS

| | | | | |
|---|---|---|---|---|
| 5,746,107 | A | * | 5/1998 | Gautier .................. B60T 13/57 91/376 R |
| 7,926,784 | B2 | * | 4/2011 | Fleming .................. F16K 47/08 251/282 |
| 2007/0278440 | A1 | * | 12/2007 | Hoeptner, III ............ F16K 1/04 251/210 |

FOREIGN PATENT DOCUMENTS

CN      102923113 A      2/2013

* cited by examiner

*Primary Examiner* — Kevin Murphy
*Assistant Examiner* — Kelsey Cary
(74) *Attorney, Agent, or Firm* — William H. Honaker; Dickinson Wright PLLC

(57) ABSTRACT

The subject disclosure provides a balance valve and a vacuum booster. The balance valve includes a valve seat (11), a connecting cylinder (16) and a conic cylinder (17) orderly connected from left to right, wherein the valve seat (11) is annular, a sealing flange (12) is provided on an outer periphery of the conic cylinder (17), a protruded lip (13) for sealing is provided on an outer periphery of the valve seat (11), and the valve seat (11) is provided therein with a via hole (14) for communicating a left surface of the valve seat (11) with a right surface of the valve seat (11) outside the connecting cylinder (16). The vacuum booster having the balance valve can reduce a difference between the starting force and the restoring force, thereby increasing the restoring force while keeping the starting force of the same level.

6 Claims, 6 Drawing Sheets

BALANCE VALVE AND VACUUM BOOSTER

CROSS REFERENCE TO RELATED APPLICATION

The subject application claims priority to CN 201420518578.1 filed on Sep. 10, 2014, the entire disclosure of which is incorporated herein by reference.

FIELD OF THE INVENTION

The present invention relates to the technical field of automobile brake, and particularly, to a balance valve, and a vacuum booster having the balance valve.

BACKGROUND OF THE INVENTION

The vacuum booster is a boosting device for the automobile brake system. The function is to amplify the pedal input force to reduce the braking force applied by the driver. The principle is that the booster has a front cavity and a rear cavity separated by a valve body diaphragm and a diaphragm tray. The two cavities are kept in a vacuum state by a vacuum pump or an auxiliary vacuum pump of the engine intake manifold, and a pressure difference is formed by controlling the vacuum degree of one cavity, so as to achieve the boosting effect.

During usage, the brake takes effect only when the driver overcomes the starting force, thus the assembly plant wishes the starting force to be small. Meanwhile, the restoring force can help the pedal to return, thus the restoring force is hoped to be large. But the prior art vacuum boosters disclosed by the Chinese Patent CN 102923113 A (publication date: Feb. 13, 2013), has a problem in that the restoring force is small.

Starting force, as used in the subject disclosure, includes a minimum input force when the vacuum booster starts generating an output force.

Restoring force, as the term is used in the subject disclosure, occurs during the continuous decrease of an input force of the vacuum booster, and includes the input force obtained when the output force is decreased to zero.

SUMMARY OF THE INVENTION

In order to solve the technical problem of the prior art vacuum boosters, the present invention provides a balance valve and a vacuum booster. The vacuum booster having the balance valve can reduce the difference between the starting force and the restoring force, and increase the restoring force while ensuring the starting force of the same level.

In order to solve the technical problem, the present invention employs the following technical solution: a balance valve, comprising a valve seat, a connecting cylinder and a conic cylinder orderly connected from left to right, wherein the valve seat is annular, a sealing flange is provided on an outer periphery of the conic cylinder, a protruded lip for sealing is provided on an outer periphery of the valve seat, and the valve seat is provided therein with a via hole for communicating a left surface of the valve seat with a right surface of the valve seat outside the connecting cylinder.

The lip is provided at an edge on a right side of the valve seat.

The projection of the lip on a plane passing through an axis of the balance valve is a triangle.

A bottom edge of the triangle is located in the valve seat, a left edge of the triangle is connected to an outer periphery of the valve seat, a right edge of the triangle is connected to the right surface of the valve seat, and a vertex angle of the triangle is shifted towards a right side of the balance valve.

A vertex of the triangle is provided on a right side of the right surface of the valve seat.

The projection of the lip on a plane passing through an axis of the balance valve is an arc.

The valve seat is provided therein with a plurality of the via holes arranged in an axial direction of the balance valve.

A vacuum booster comprises a valve body provided therein with the balance valve, wherein the sealing flange and the lip of the balance valve are both sealedly connected to an inner wall of the valve body, and an annular boss is provided at a portion of the valve body facing a left surface of the valve seat; when the annular boss abuts against the valve seat, an inner wall of the valve body, an inner side of the annular boss and the left surface of the valve seat enclose a first cavity, the inner wall of the valve body and an outer surface of the balance valve between the lip and the sealing flange enclose a second cavity, and the first cavity is communicated with the second cavity through the via hole.

A distance from the via hole to an axis of the balance valve is less than a distance from the annular boss to the axis of the balance valve.

The present invention has the following beneficial effect: the vacuum booster having the balance valve can reduce a difference between the starting force and the restoring force, thereby increasing the restoring force while keeping the starting force of the same level.

BRIEF DESCRIPTION OF THE DRAWINGS

The balance valve of the present invention will be further described in details with reference to the drawings, wherein.

DETAILED DESCRIPTION OF THE PREFERRED EMBODIMENTS

Figure 1:
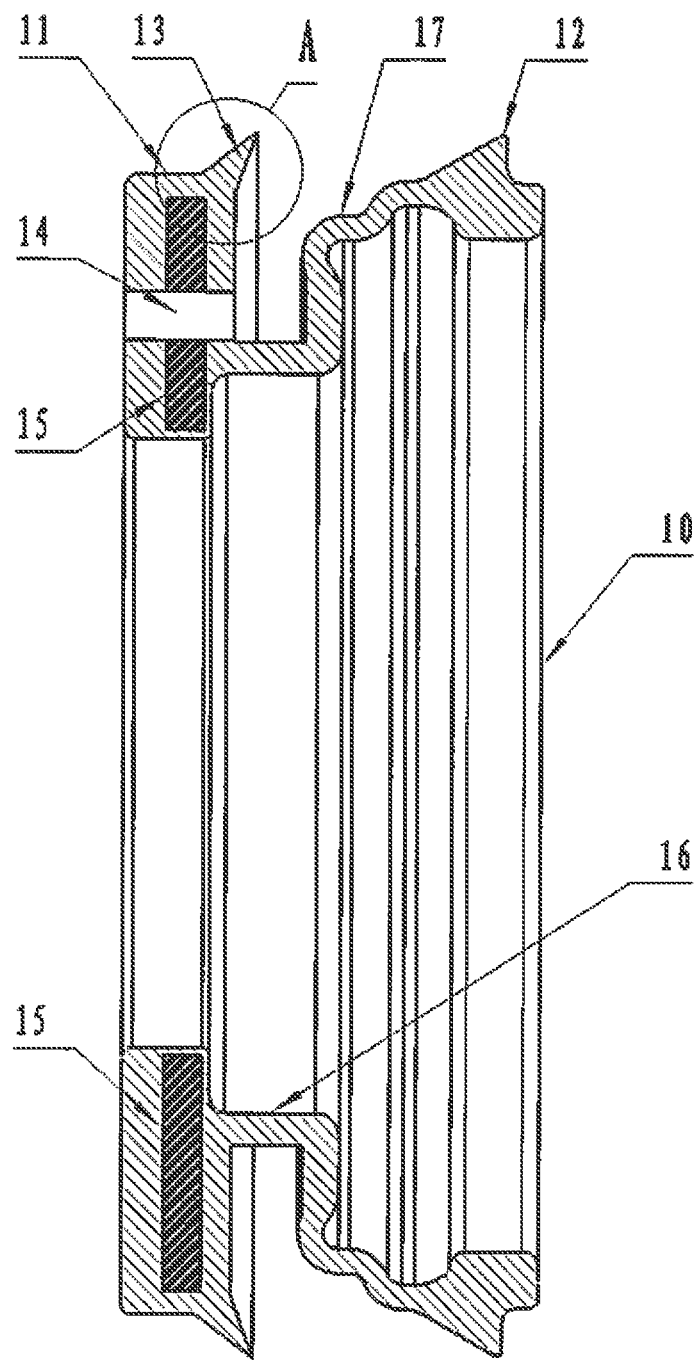
FIG. 1 is an overall structural diagram of a balance valve.

The balance valve of the present invention will be further described in details with reference to the drawings. A balance valve comprises a valve seat 11, a connecting cylinder 16 and a conic cylinder 17 orderly connected from left to right, wherein the valve seat 11 is annular, a sealing flange 12 is provided on an outer periphery of the conic cylinder 17, a protruded lip 13 for sealing is provided on an outer periphery of the valve seat 11, and the valve seat 11 is provided therein with a via hole 14 for communicating a left surface of the valve seat 11 with a right surface of the valve seat 11 outside the connecting cylinder 16, as illustrated in FIGS. 1 and 2.

Figure 2:
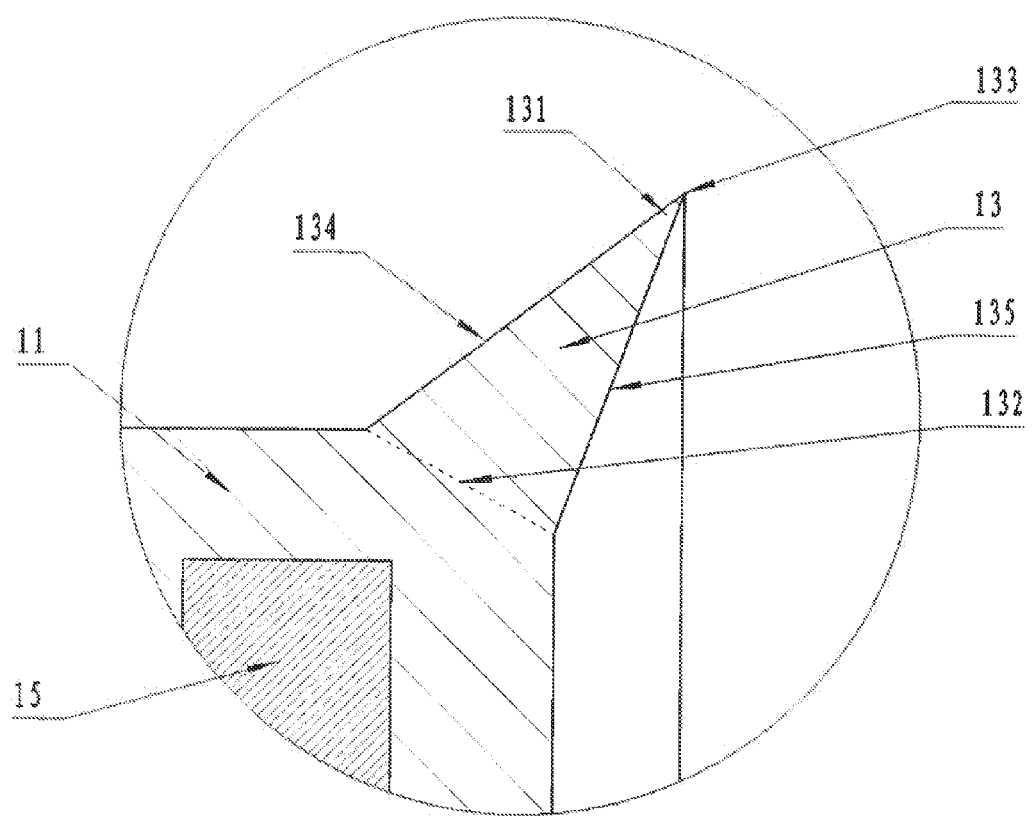
FIG. 2 is an enlarged diagram of a lip portion in FIG. 1.

The lip 13 is provided at an edge on the right side of the valve seat 11, as illustrated in FIG. 2. The projection of the lip 13 on a plane passing through an axis of the balance valve is a triangle.

In order to prolong the service life of the lip 13, a bottom edge 132 of the triangle is located in the valve seat 11, a left edge 134 of the triangle is connected to the outer periphery of the valve seat 11, a right edge 135 of the triangle is connected to a right surface of the valve seat 11, a vertex angle 131 of the triangle is shifted towards the right side of the balance valve, i.e., the vertex 133 of the triangle is provided on the right side of the right surface of the valve seat 11, as illustrated in FIG. 2. Alternatively, the projection of the lip 13 on the plane passing through the axis of the balance valve may also be an arc.

The valve seat 11 is provided therein with a plurality of via holes 14 arranged in an axial direction of the balance valve. The valve seat 11 is further provided therein with an annular sheet metal 15 for supporting. In order to prolong the service life of the via hole 14, the via hole 14 passes through the annular sheet metal 15.

Figure 3:
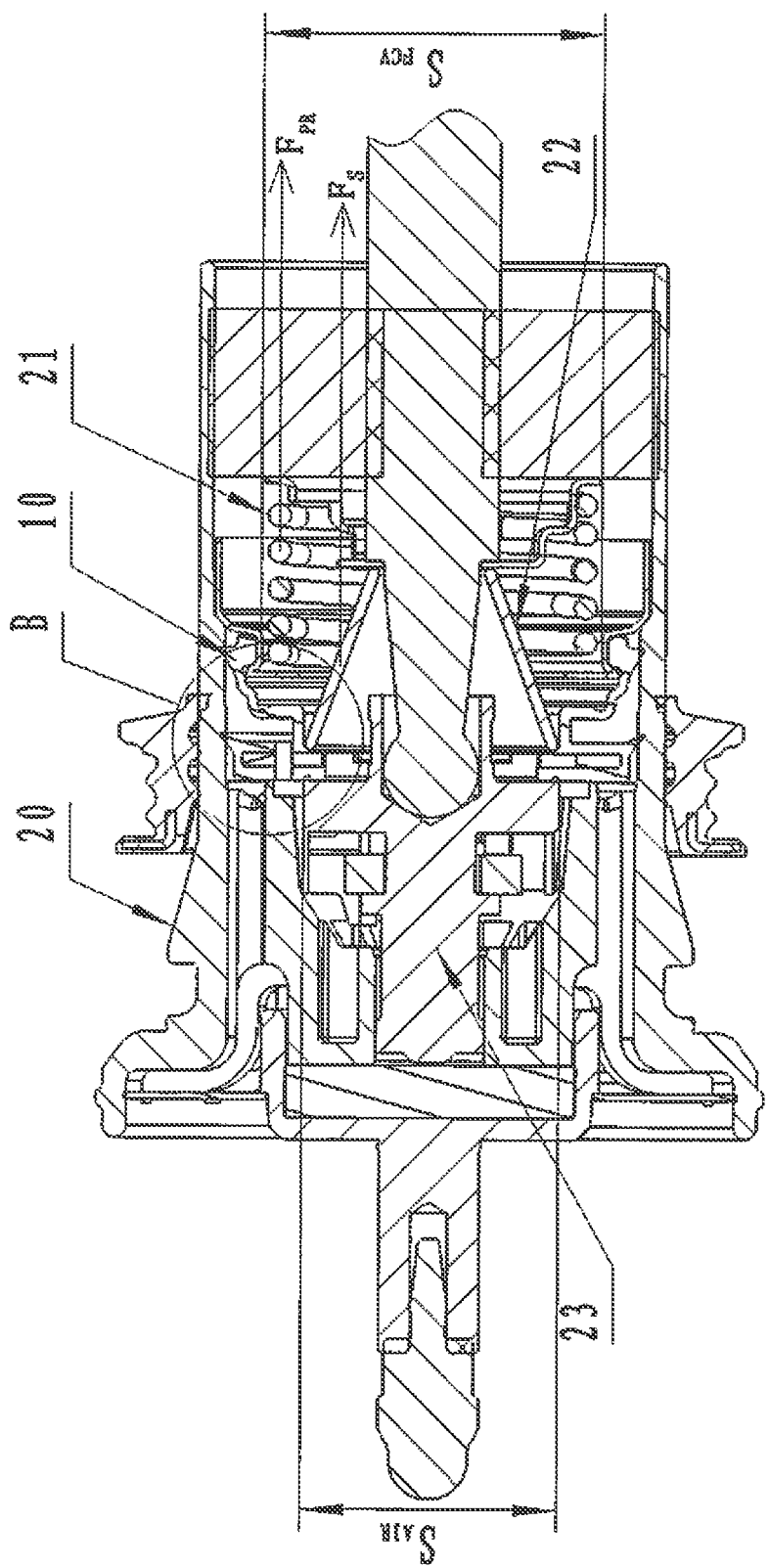
FIG. 3 is an overall structural diagram of a vacuum booster of the present application.
Figure 4:
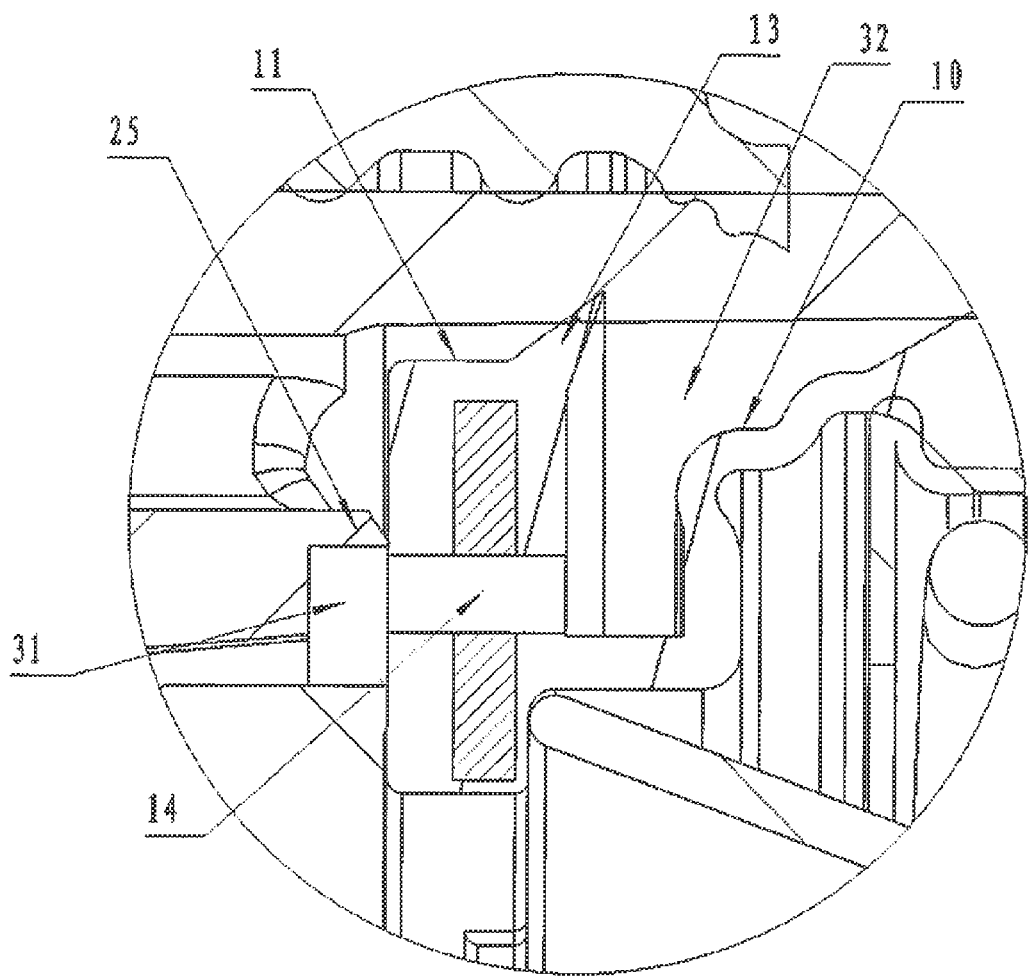
FIG. 4 is an enlarged diagram of portion A in FIG. 3.

A vacuum booster having the balance valve comprises a valve body 20 provided therein with the balance valve 10. The valve body 20 is further provided therein with a push rod spring 21, a valve spring 22, a cavity valve 23 and a push rod 24, wherein the sealing flange 12 and the lip 13 of the balance valve 10 are both sealedly connected to an inner wall of the valve body 20, and a boss 25 is provided at a portion of the valve body 20 facing a left surface of the valve seat 11; when the boss 25 abuts against the valve seat 11, the inner wall of the valve body 20, an inner side of the boss 25 (i.e., a side close to the axis) and the left surface of the valve seat 11 enclose a first cavity 31, the inner wall of the valve body 20 and an outer surface of the balance valve 10 between the lip 13 and the sealing flange 12 enclose a second cavity 32, and the first cavity 31 is communicated with the second cavity 32 through the via hole 14, as illustrated in FIGS. 3 and 4.

In addition, the via holes 14 are arranged in the axial direction of the balance valve 10. A distance from the via hole 14 to the axis of the balance valve 10 is less than a distance from the boss 25 to the axis of the balance valve 10.

Next, it will be introduced how the balance valve 10 and the vacuum booster of the present invention reduce the restoring force.

Figure 5:
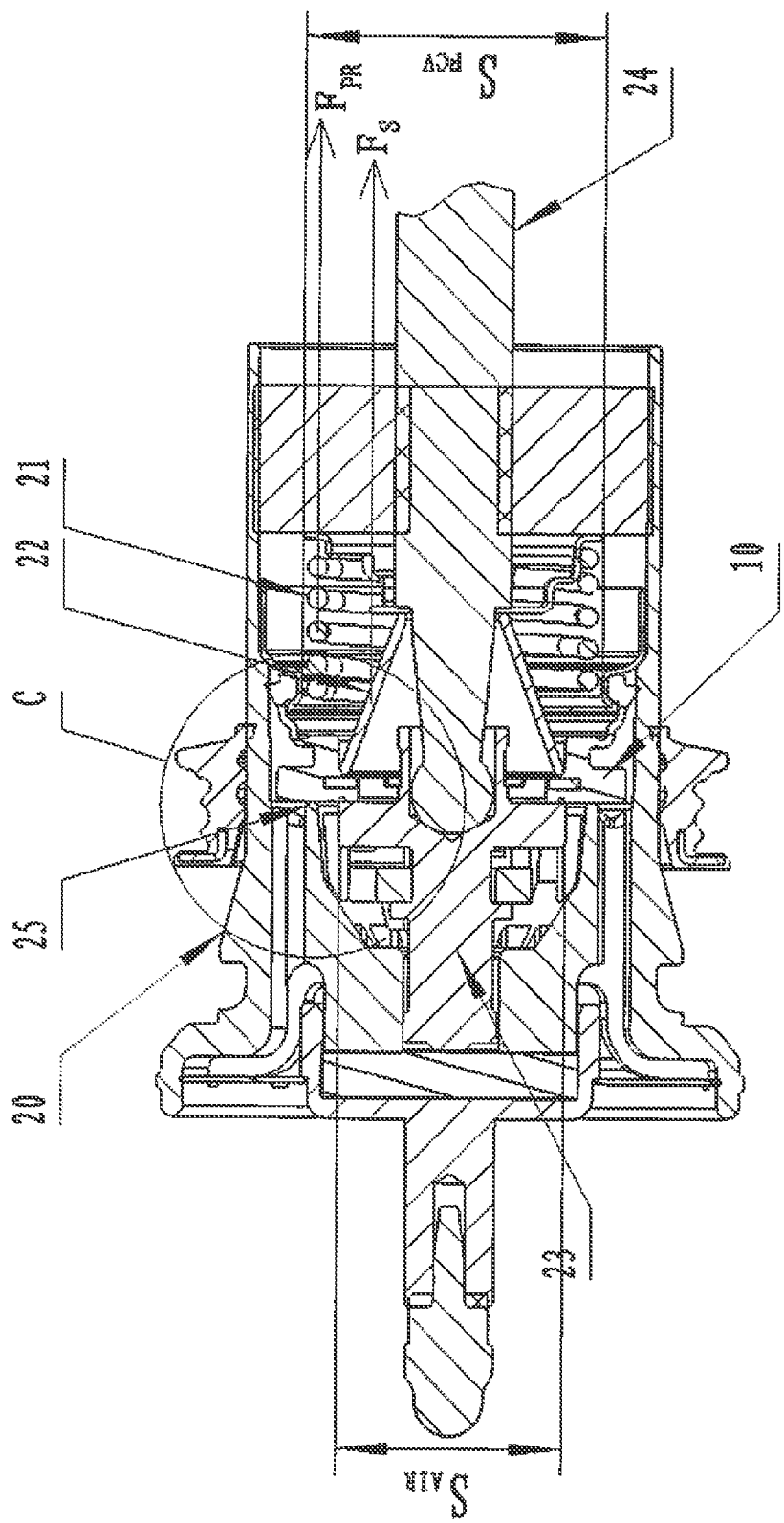
FIG. 5 is an overall structural diagram of a vacuum booster in the prior art.
Figure 6:
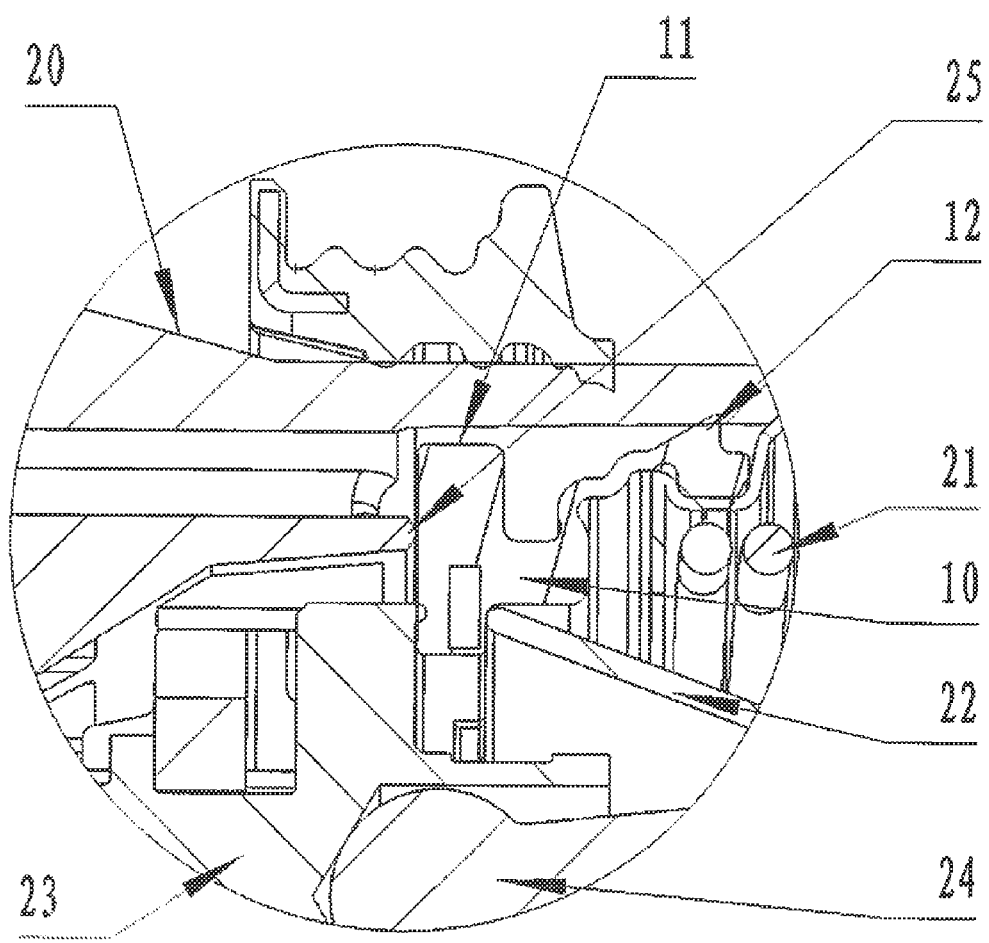
FIG. 6 is an enlarged diagram of portion B in FIG. 5.

In the prior art, as illustrated in FIGS. 5 and 6, $$F_A=F_{PR}+F_S-S_{AIR}\times\Delta p;$$

$$Fr=F_{PR}-S_{FCV}\times\Delta p;$$

$F_A$ is a starting force;
Fr is a restoring force;
$F_{PR}$ is an elastic force of a push rod spring;
$F_S$ is an elastic force of a valve spring;
$S_{AIR}$ is an effective area of an air valve;
$S_{FCV}$ is an effective area of an balance valve;
$\Delta p$ is a pressure difference.
When the prior art uses the following parameters:

$$\begin{aligned}F_A &= F_{PR}+F_S-S_{AIR}\times\Delta p\\ &= 97.9+12.97-41.8\times 0.66\\ &= 83.3N\end{aligned}$$

$$\begin{aligned}Fr &= F_{PR}-S_{FCV}\times\Delta p\\ &= 97.9-90\times 0.66\\ &= 38.5N\end{aligned}$$

Difference = 44.8N

After the vacuum booster of the present application is used:

Before the driver steps on the brake pedal, the air valve port is closed, and the vacuum valve port is opened. What is the input force required to open the air valve port? In accordance with the force relation as illustrated in FIG. 3, the push rod spring force $F_{PR}$ and the valve spring force $F_S$ shall be overcome. In that case, the outside of the air valve 23 is the atmosphere and the inside thereof is the vacuum. The two sides generate a pressure difference, which helps the driver to overcome the starting force, thus Starting force $F_A F_{PR}+F_S-S_{AIR}\times\Delta p$ When the driver releases the brake pedal, what is the restoring force helpful for the brake pedal to return before the vacuum valve port is opened again? In that case, the air valve port is closed, the vacuum valve port is closed and to be opened. In accordance with the force relation as illustrated in FIG. 3, the push rod spring force $F_{PR}$ and the valve spring force $F_S$ shall be overcome. In that case, the outside of the air valve 23 is the atmosphere and the inside thereof is the vacuum. The two sides generate a pressure difference, which helps the brake pedal to return, thus Restoring force $Fr=F_{PR}-S_{AIR}\times\Delta p$ When the present application uses the following parameters:

$$\begin{aligned}F_A &= F_{PR}+F_S-S_{AIR}\times\Delta p\\ &= 97.9+12.97-41.8\times 0.66\\ &= 83.3N\end{aligned}$$

$$\begin{aligned}Fr &= F_{PR}-S_{AIR}\times\Delta p\\ &= 97.9-41.8\times 0.66\\ &= 70.3N\end{aligned}$$

Difference = 13N

It is clear that as compared with the prior art, when the starting force is the same, the vacuum booster of the present invention can increase the restoring force, while reducing the difference between the starting force and the restoring force.

The above descriptions are just specific embodiments of the present invention, and cannot be used to limit the implementation scope of the present invention. Therefore, any replacement with an equivalent component, or any equivalent change and modification within the patent protection scope of the present invention, shall be covered by the patent. In addition, in the present invention, the technical features or the technical solutions can be freely combined with each other, and the technical features can be freely combined with the technical solutions.

What is claimed is:

1. A vacuum booster comprising,
    a valve body (20) extending between a first opened end and a second opened end and disposed on a center axis and having an inner wall extending about said center axis defining a chamber,
    a balance valve (10) disposed in said chamber and in sealing engagement with said inner wall,
    said balance valve (10) including a valve seat (11) extending about and along said center axis having a left surface adjacent said first opened end and a right surface adjacent said second opened end and an outer periphery spaced from said inner wall connecting said left surface and said right surface and defining a bore disposed on said center axis extending between said left surface and said right surface,
    a connecting cylinder (16) extending annularly about said center axis and axially from said right surface of said valve seat (11), a conic cylinder (17) extending axially from said connecting cylinder (16) and to a terminal region and tapering radially outwardly between said connecting cylinder (16) and said terminal region, a sealing flange (12) extending radially outwardly from said conic cylinder (17) and engaging said inner wall of said valve body (20), a protruded lip (13) of triangular shape in cross-section defining a bottom edge (132) disposed in said valve seat (11) and a left edge (134) extending outwardly from said outer periphery of said valve seat (11) and a right edge (135) extending outwardly from said right surface of said valve seat (11) with said left edge (134) and said right edge (135) converging to a vertex (133) spaced axially from said right surface of said valve seat (11) toward said conic cylinder (17) with said vertex (133) of said protruded lip (13) being in sealing engagement with said inner wall of said valve body (20) to increase restoring force and reducing differential between starting force and the reducing force, said valve seat (11) defining a via hole (14) extending between said left surface and said right surface of the valve seat (11) for allowing fluid communication through said valve seat (11), said sealing flange (12) and said protruded lip (13) extending annularly about said center axis with said sealing flange (12) and said vertex (133) of said protruded lip (13) being disposed in sealing engagement with said inner wall of said valve body (20) whereby an end of said sealing flange (12) and said vertex (133) of said protruded lip (13) are coplanar with one another along a plane that is parallel to said center axis to engage said inner wall of said valve body (20) thereby increasing restoring force required to return a brake pedal.

2. The vacuum booster according to claim 1, wherein said protruded lip (13) is provided at an upper edge on said right surface of said valve seat (11).

3. The vacuum booster according to claim 1, wherein said via hole (14) extends axially.

4. The vacuum booster according to claim 1 wherein said valve body (20) includes an annular boss (25) disposed adjacent to said via hole (14) of said left surface of said valve seat (11) and abutting against said valve seat (11) defining a first cavity (31) between said annular boss (25) and said left surface of said valve seat (11) and a second cavity (32) between said inner wall of said valve body (20) and said connecting cylinder (16) and said conic cylinder (17) of said balance valve (10) with said first cavity (31) being disposed in communication with said second cavity (32) through said via hole (14).

5. The vacuum booster according to claim 4, wherein a distance from said via hole (14) to said center axis of said balance valve (10) is less than a distance from said annular boss (25) to said center axis.

6. The vacuum booster according to claim 1 wherein said protruded lip (13) extends annularly about said center axis to engage said valve body (20).

* * * * *